United States Patent
Ybanez Zepeda

(10) Patent No.: US 9,182,812 B2
(45) Date of Patent: Nov. 10, 2015

(54) VIRTUAL SENSOR SYSTEMS AND METHODS

(71) Applicant: Ayotle, Paris (FR)

(72) Inventor: José Alonso Ybanez Zepeda, Paris (FR)

(73) Assignee: Ayotle, Paris (FR)

( * ) Notice: Subject to any disclaimer, the term of this patent is extended or adjusted under 35 U.S.C. 154(b) by 216 days.

(21) Appl. No.: 13/736,628

(22) Filed: Jan. 8, 2013

(65) Prior Publication Data

US 2014/0191938 A1    Jul. 10, 2014

(51) Int. Cl.
| | | |
|---|---|---|
| G06F 3/01 | (2006.01) | |
| G06F 3/03 | (2006.01) | |
| G06F 3/0481 | (2013.01) | |
| G06F 3/0484 | (2013.01) | |

(52) U.S. Cl.
CPC *G06F 3/01* (2013.01); *G06F 3/017* (2013.01); *G06F 3/0304* (2013.01); *G06F 3/04815* (2013.01); *G06F 3/04842* (2013.01)

(58) Field of Classification Search
CPC ..... G06F 1/1601; G06F 3/0488; G06F 3/017; G06F 3/0484; G06F 3/04845; G06F 3/04842; G06F 3/04815; G09B 9/165
See application file for complete search history.

(56) References Cited

U.S. PATENT DOCUMENTS

| | | | |
|---|---|---|---|
| 2006/0139314 A1 | 6/2006 | Bell | |
| 2010/0017407 A1* | 1/2010 | Beniyama et al. | 707/6 |
| 2010/0053152 A1* | 3/2010 | Lewis et al. | 345/419 |
| 2010/0060570 A1* | 3/2010 | Underkoffler et al. | 345/156 |
| 2010/0107099 A1 | 4/2010 | Frazier et al. | |
| 2012/0218395 A1* | 8/2012 | Andersen et al. | 348/77 |
| 2014/0063232 A1* | 3/2014 | Fairfield et al. | 348/118 |

FOREIGN PATENT DOCUMENTS

| | | |
|---|---|---|
| EP | 2 521 097 A1 | 11/2012 |
| WO | 2009/035705 A1 | 3/2009 |
| WO | 2012/155997 A1 | 11/2012 |

OTHER PUBLICATIONS

International Search report for corresponding PCT Application No. PCT/IB2013/003150, mailed Jul. 3, 2014 (9 pages).
International Search report for corresponding PCT Application No. PCT/IB2013/003149, mailed Jul. 15, 2014 (17 pages).

* cited by examiner

*Primary Examiner* — Sanjiv D Patel
(74) *Attorney, Agent, or Firm* — Osha Liang LLP

(57) ABSTRACT

Methods and systems for detecting activation of a virtual sensor in a scene are proposed, wherein the virtual sensor comprises data representing a geometric form, data representing a position in the scene and data representing one or several trigger conditions. A data representation of the scene is captured, and a determination of whether a virtual sensor trigger condition is fulfilled is made, based on an analysis of the captured data representation in an area corresponding to the geometric form and position of the virtual sensor.

14 Claims, 6 Drawing Sheets

VIRTUAL SENSOR SYSTEMS AND METHODS

BACKGROUND OF THE INVENTION

1. Field of the Invention

The subject disclosure relates to the field of human-machine interface technologies.

2. Background

Human-machine interface (HMI) technologies have rapidly developed over the recent years. For example, technologies such as touchscreen to control devices such as computers, tablets, smartphones have been massively expanding to an ever-increasing variety of devices and developing to include emerging technologies such as tactile touchscreens. New types of sensors have appeared, redefining the way people interface with devices and, in particular, opening the way for new fields of home automation. An example is the control of lights, devices such as door opening systems, or software such as window locking systems, which today can involve the use of switches, motion sensors, dimmers, or even smartphones.

Current HMI technologies however require several sensors and connection links to be used and setup in order to control objects. For example, switching a light requires a switching system or, in more complex systems, a computer or a smartphone. In these last cases, interface devices such as a keyboard will be necessary to interact with the control device. These technologies are therefore limited in that adding new interactions often requires adding new sensors and corresponding electronic or modifying a computer-based or smartphone-based application. Said otherwise, evolution of those technologies can require significant additional material and software development.

Hence, HMI technologies have evolved through the development of sensors (such as, for instance touchscreen) designed to be triggered upon detection of a gesture thus defining new ways of interacting with a device. Such sensors require analysis of the user's gesture.

There remains a need therefore for improved human-machine interface technologies, in particular with respect to the flexibility and ease of evolution.

SUMMARY OF THE INVENTION

It is an object of the present subject disclosure to provide systems and methods for detecting activation of a virtual sensor in a scene.

A method for detecting activation of a virtual sensor in a scene according to an aspect of the present subject disclosure comprises, for a virtual sensor which comprises data representing a geometric form, data representing a position in the scene and data representing one or several trigger conditions, capturing a first data representation of the scene, and determining whether one or several of the virtual sensor trigger conditions is/are fulfilled based on an analysis of the captured first data representation in an area corresponding to the geometric form and position of the virtual sensor.

An advantage of virtual sensors, as compared to gesture-based solutions, is that virtual sensors do not require any analysis of a user's gestures. According to an aspect of the present disclosure, virtual sensors corresponding to three-dimensional (3D) objects are defined and configured, and a 3D sensor is used to determine if an object entered the volume area corresponding to the virtual sensor. There is therefore no need to teach a user a new gesture pattern. One can add interaction to any object with a non-intrusive technology based on the aspects of the present subject disclosure.

Another advantage of virtual sensors is the ease with which new virtual sensors can be defined, without requiring significant additional material (real sensors) or further developments, for example of software applications, making it a very flexible and adaptive solution. A virtual sensor can also be redefined or modified, in order to dynamically adapt to changes of a system which it is part of. It can also integrate or be coupled to a control engine for execution of any command upon detection of its being activated.

According to further aspects of the present disclosure, disclosed is a system for detecting activation of a virtual sensor in a scene. The system may comprise a scene capture sub-system configured to capture a scene and generate a first data representation of the scene, and a virtual sensor sub-system in operative communication with the scene capture sub-system, the virtual sensor sub-system comprising an interface for receiving data representing the first data representation of the scene, a processor, and a memory operatively coupled to the processor. The virtual sensor sub-system may be configured to perform a method for detecting activation of the virtual sensor in the scene, wherein the virtual sensor comprises data representing a geometric form, data representing a position in the scene and data representing one or several trigger conditions, the method comprising capturing a first data representation of the scene and determining whether one or several of the virtual sensor trigger conditions is/are fulfilled based on an analysis of the captured first data representation in an area corresponding to the geometric form and position of the virtual sensor.

According to one or more additional aspects, disclosed is a computer-readable storage medium storing computer-executable instructions for detecting activation of a virtual sensor in a scene, the computer executable instructions comprising data representing a geometric form of the virtual sensor, data representing a position of the virtual sensor in the scene, and data representing one or several trigger conditions of the virtual sensor, and instructions for receiving data representing a first data representation of the scene, analyzing received data representing a first data representation of the scene in an area corresponding to the geometric form and position of the virtual sensor, and determining whether one or several of the virtual sensor trigger conditions is/are fulfilled based on the analysis of the received data.

According to yet other aspects, disclosed is a computer program product comprising computer program code tangibly embodied in a computer readable medium, said computer program code comprising instructions to, when provided to a computer system and executed, cause said computer to perform a method for detecting activation of a virtual sensor in a scene, wherein the virtual sensor comprises data representing a geometric form, data representing a position in the scene and data representing one or several trigger conditions, the method comprising determining whether one or several of the virtual sensor trigger conditions is/are fulfilled based on an analysis of data representing a captured first data representation of the scene in an area corresponding to the geometric form and position of the virtual sensor.

According to yet other aspects, disclosed is a non-transitory computer-readable storage medium storing a computer program that, when executed, causes a system comprising a processor operatively coupled with a memory, to perform a method for detecting activation of a virtual sensor in a scene, wherein the virtual sensor comprises data representing a geometric form, data representing a position in the scene and data representing one or several trigger conditions, the method comprising determining whether one or several of the virtual sensor trigger conditions is/are fulfilled based on an analysis of data representing a captured first data representation of the scene in an area corresponding to the geometric form and position of the virtual sensor.

The first data representation of the scene may be captured via various sensor technologies, such as image sensors, ultrasound sensors, infra-red sensors, or any sensor which is capable to generate data from which position in space information can be derived. According to another aspect, the first data representation of the scene includes an image data representation of the scene.

According to yet another embodiment, the proposed method further comprises capturing a second data representation of the scene, and configuring the geometric form and position of the virtual sensor based on an image generated from the captured second data representation.

According to yet another embodiment, the virtual sensor may comprise data representing a three-dimensional geometric form, and the proposed method may further comprise generating point cloud data representing the scene, the point cloud data comprising data representing points of a volume area corresponding to the captured first data representation and associated position in the volume area, and the determining whether a virtual sensor trigger condition is fulfilled may comprise analyzing data representing points in the volume area which correspond to the geometric form and position of the virtual sensor.

According to yet another embodiment of the method, the analyzing point cloud data representing points in the volume area which correspond to the geometric form and position of the virtual sensor may comprise detecting the points of the point cloud which are positioned in the area corresponding to the geometric form and position of the virtual sensor, and comparing the number of detected points to a predetermined threshold.

According to yet another embodiment of the method, the analyzing point cloud data representing points in the volume area which correspond to the geometric form and position of the virtual sensor may comprise detecting the points of the point cloud which are positioned in the area corresponding to the geometric form and position of the virtual sensor, determining an intensity value representing intensity amounts for some of the detected points, and comparing the determined intensity value to a predetermined threshold.

According to yet another embodiment of the method, the method may further comprise processing the captured first data representation of the scene for removing data that represent a background of the scene.

According to yet another embodiment of the method, the method may further comprise defining and configuring one or several virtual sensors in the scene using the first data representation of the scene.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
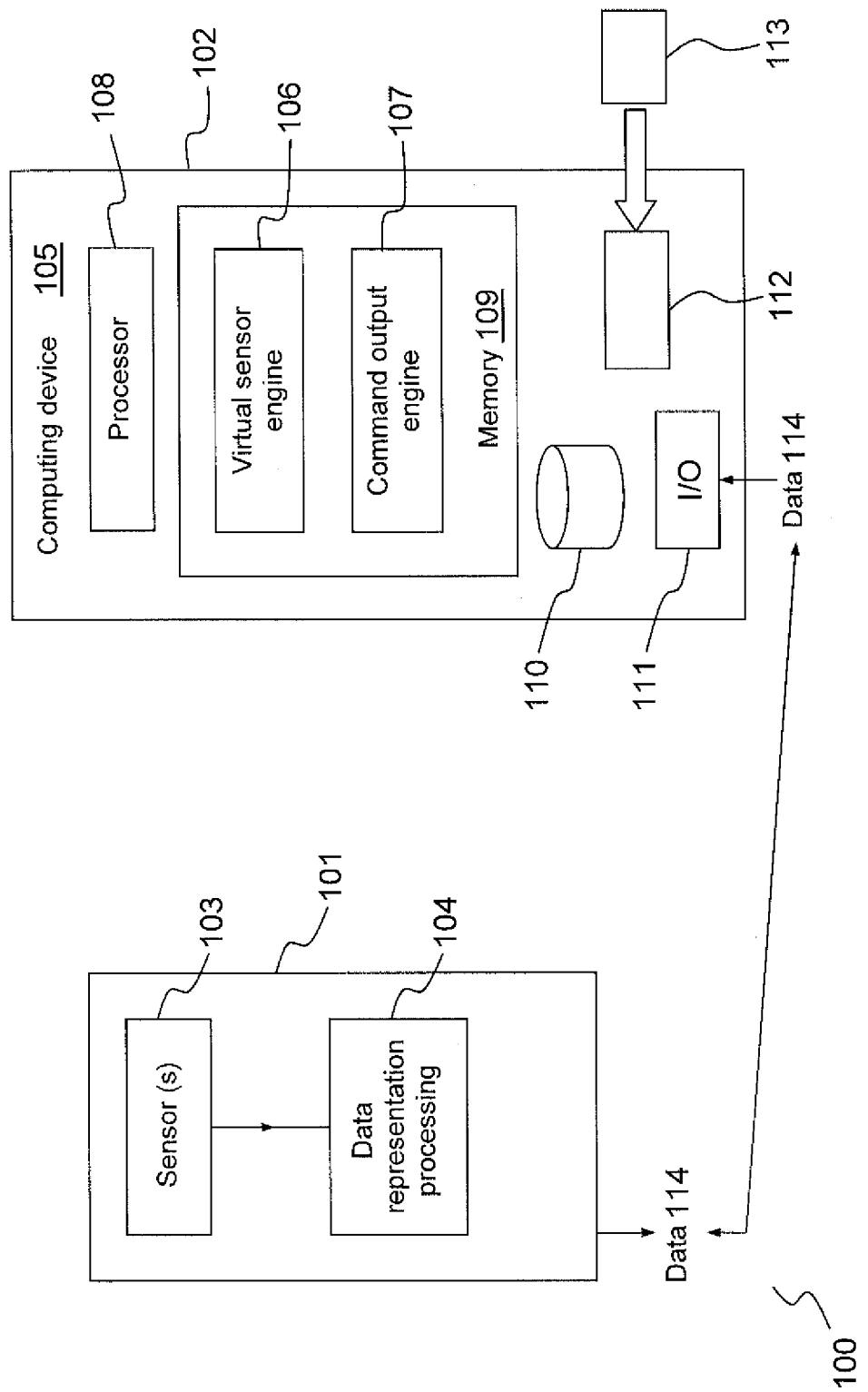
FIG. 1 illustrates an example virtual sensor system according to an example embodiment.

The advantages, and other features of the components disclosed herein, will become more readily apparent to those having ordinary skill in the art form. The following detailed description of certain preferred embodiments, taken in conjunction with the drawings, sets forth representative embodiments of the subject technology, wherein like reference numerals identify similar structural elements.

In addition, it should be apparent that the teaching herein can be embodied in a wide variety of forms and that any specific structure and/or function disclosed herein is merely representative. In particular, one skilled in the art will appreciate that an embodiment disclosed herein can be implemented independently of any other embodiments and that several embodiments can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer. Examples of computer storage media include, but are not limited to, a flash drive or other flash memory devices (e.g. memory keys, memory sticks, key drive), CD-ROM or other optical storage, DVD, magnetic disk storage or other magnetic storage devices, memory chip, RAM, ROM, EEPROM, smart cards, or any other suitable medium from that can be used to carry or store program code in the form of instructions or data structures which can be read by a computer processor. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Visual Basic, HTML, PHP, Java, Javascript, Python, and bash scripting.

Additionally, the word "exemplary" as used herein means serving as an example, instance, or illustration. Any aspect or design described herein as "exemplary" is not necessarily to be construed as preferred or advantageous over other aspects or designs.

Referring to the figures, FIG. 1 illustrates an exemplary virtual sensor system 100 configured to use a virtual sensor feature in accordance with the present disclosure. The system 100 includes a scene capture sub-system 101 and a virtual sensor sub-system 102.

The scene capture sub-system 101 is configured to capture a scene and generate data representing the captured scene. In an embodiment, it comprises one or several sensors 103 and a data representation processing module 104. The scene capture subsystem 101 may use different sensing technologies as well as one or a plurality of sensors 103 of the same or different technologies. It is configured so that it can generate data representing points with corresponding position in one-dimensional, two-dimensional or three-dimensional space information.

In embodiments in which several sensors 103 are used to capture the scene (which may be of the same or of different types), the data generated by the sensors 103 may be transmitted to the data representation processing module 104 where it is combined, and may be further processed for generating data 114 suitable for exploitation by the virtual sensor sub-system 102.

For example, as to sensing technologies, sensors such as image sensors (included, but not limited to, 3D image sensors), infrared sensors, ultrasound sensors may be used for implementing a scene capture sub-system 101. Examples of sensors 103 include, but are not limited to, cameras, 3D cameras, stereovision systems, SONAR, laser cameras, LIDARS, and microphone arrays.

In the exemplary case where distance sensors are used, which generate point data with corresponding one-dimensional position information, three distance sensors 103 may be used in a scene capture sub-system 101 and positioned with respect to the scene to be captured. When several distance sensors 103 are positioned to capture the scene, each of the sensors 103 may generate measure values, and the measured values generated by all sensors 103 may be combined by the data representation processing module 104 to generate vectors of measure values. In another exemplary embodiment, several sensors are used to capture the scene, and are positioned as groups of sensors wherein each group of sensors includes several sensors positioned with respect to each other in a matrix. In such case the measured values generated by all sensors 103 may be combined by the data representation processing module 104 to generate matrices of measured values. In such case each point of a matrix of measured values may represent the input of a specific sensor 103.

In some embodiments, the scene capture sub-system 101 may be an image capture sub-system configured to generate image data representations of the captured scene. For example, in some embodiments, the scene capture sub-system 101 may include one or several two-dimensional image sensors 103, each of which may generate a 2D image data representation of the capture scene. Such image sensors 103 may be any device configured to, in combination with the data representation processing module 104, generate a three-dimensional data representation of the captured scene using any suitable technique such as, but not limited to, stereovision image acquisition. For example, in the case of stereovision 3D image acquisition, two cameras 103 may be used to acquire stereopair images.

In some embodiments in which the scene capture sub-system 101 may be an image capture sub-system configured to generate image data representations of the captured scene, the scene capture sub-system 101 may be a tri-dimensional (3D) capture system configured to generate 3D images, and include for example a 3D image sensor 103. The 3D image sensor 103 may generate 3D image data such as a depth image or a point cloud.

In some embodiments, a sensor 103 is an image sensor that generates a depth image, that is, a matrix of pixel data where each pixel data may include a value representing a distance between an object of the captured scene and the sensor 103. The data representation processing module 104 may, in an embodiment, reconstruct 3D coordinates for each pixel of a depth image, using the distance value associated therewith in the depth image data, and using information regarding optical features (such as, for example, focal length) of the image sensor that generated the depth image.

In some embodiments, a sensor 103 is an image sensor that generates point cloud data, that is, a set of pixel data where each pixel data may include 3D coordinates with respect to a predetermined origin, and also include in addition to the 3D coordinate data other data such as color data, intensity data, noise data, etc.

The data representation processing module 104 is operatively coupled to the image sensor(s) 103 and configured to perform any suitable processing of the data generated by the image sensor(s) 103. For example, in an embodiment, the processing may include transcoding raw data generated by the image sensor(s) 103 to data in a format that is compatible with the data format which the virtual sensor sub-system 102 is configured to handle. Another processing that the image processing module may, in an embodiment, provide, is the combination of data generated by plural sensors 103.

In an embodiment, the data representation processing module 104 is configured to generate, based on a data representation of the scene captured by the sensor(s) 103, point cloud data comprising data representing points of a volume area captured by the sensor(s) 103 and respective associated position in the volume area. In an embodiment, the data representing a position respectively associated with a point of the point cloud may be comprise data representing a triplet of 3D coordinates with respect to a predetermined origin, which may be chosen to coincide with one of the sensor(s) 103. As described above, the generation of point cloud data may not be necessary, for example in an embodiment in which the scene capture sub-system 101 includes a 3D camera that directly outputs point cloud data. In another embodiment, the generation of point cloud data may include transcoding image depth data into point cloud data as described above. In other embodiments, the generation of point cloud data may include combining data output by a plurality of 1D and/or 2D sensors and generate point cloud data based on such combined data.

It will be appreciated that although the image sensor(s) and data representation processing module 104 are illustrated as part of the scene capture sub-system 101, no restrictions are placed on the architecture of the scene capture sub-system 101, or on the control or locations of components 103-104. In particular, in some embodiments, part or all of components 103-104 may be operated under the control of different entities and/or on different computing systems. For example, the image processing module may be incorporated in a camera device or as part of the virtual sensor sub-system 102. Further, it should be noted that the data representation processing module 104 may include a processor-driven device, and include a processor and a memory operatively coupled with the processor, and may be implemented in software, in hardware, firmware or a combination thereof to achieve the capabilities and perform the functions described herein.

The virtual sensor sub-system 102 may include a processor-driven device, such as, the computing device 105 shown on FIG. 1. In the illustrated example, the computing device 105 is communicatively coupled via suitable interfaces and communication links with the scene capture sub-system 101.

In the shown implementation, a computing device 105 implements a component, such as the virtual sensor engine 106 and command output engine 107. The virtual sensor engine 106 and command output engine 107 are illustrated as software, but can be implemented as hardware or as a combination of hardware and software instructions.

The virtual sensor engine 106 includes functionality to receive 3D image data representation of the scene 114 generated and transmitted thereto by the scene capture sub-system 101 (based on a captured data representation of the scene), and analyze data of the received 3D image data representation in an area corresponding to the geometric form and position of a virtual sensor, with respect to a virtual sensor which comprises data representing a geometric form, a position in the scene and a trigger condition. The virtual sensor engine 106 further includes functionality to determine whether the virtual sensor trigger condition is fulfilled based on such analysis. In an embodiment, the data 114 transmitted by the scene capture sub-system 101 to the virtual sensor sub-system 102 may include point cloud data representation of the captured scene.

The command output engine 107 includes functionality to trigger execution of a predetermined command upon receiving information that a corresponding trigger condition of the virtual sensor is fulfilled.

When executing, such as on processor 108, the virtual sensor engine 106 is operatively connected to the command output engine 107. For example, the virtual sensor engine 106 may be part of a same software application as the command output engine 107, the command output engine 107 may be a plug-in for the virtual sensor engine 106, or another method may be used to connect the command output engine 107 to the virtual sensor engine 106.

The computing device 105 may be a computer, computer network, or other device that has a processor 108, memory 109, data storage 110, and other associated hardware such as input/output interfaces 111 (e.g. device interfaces such as USB interfaces, etc., network interfaces such as Ethernet interfaces, etc.) and a media drive 112 for reading and writing a removable computer storage medium 113. The processor 108 may be any suitable microprocessor, ASIC, and/or state machine. In some embodiments, the removable computer storage medium may contain computer instructions which, when executed by the computing device 105, cause the computing device 105 to perform one or more example methods described herein. Thus, the removable computer storage medium 113 may include instructions for implementing and executing the virtual sensor engine 106 and/or the command output engine 107. In some embodiments, at least some parts of the example virtual sensor engine 106 may be stored as instructions on a given instance of the removable storage medium 113, removable device, or in local data storage 110, to be loaded into memory 109 for execution by the processor 108. Specifically, software instructions or computer readable program code to perform embodiments may be stored, temporarily or permanently, in whole or in part, on a non-transitory computer readable medium such as a compact disc (CD), a local or remote storage device, local or remote memory, a diskette, or any other computer readable storage device.

Although the illustrated example virtual sensor engine 106 and the command output engine 107 are depicted as a program residing in memory 109, a virtual sensor engine 106 and/or the command output engine 107 may be implemented as hardware, such as an application specific integrated circuit (ASIC) or as a combination of hardware and software.

In this example system, the computing device 105 receives incoming data 114, such as 3D image data representation of the scene, from the scene capture sub-system 101, and possibly via various communication means such as a USB connection or network devices. The computing device 105 can receive many types of data sets via the input/output interface 111, which may also receive data from various sources such as the Internet or a local network.

The virtual sensor engine 106 may also generate or ultimately produce control signals to be used by the command output engine 107, for associating an action or command with detection of a specific triggering condition of a virtual sensor.

It will be appreciated that the virtual sensor system 100 shown and described with reference to FIG. 1 is provided by way of example only. Numerous other architectures, operating environments, and configurations are possible. Other embodiments of the system may include fewer or greater number of components, and may incorporate some or all of the functionality described with respect to the system components shown in FIG. 1. Accordingly, although the sensor(s) 103, the data representation processing module 104, the virtual sensor engine 106, the command output engine 107, the local memory 109, and the data storage 110 are illustrated as part of the virtual sensor system 100, no restrictions are placed on the location and control of components 103-104-106-107-109-110. In particular, in other embodiments, components 103-104-106-107-109-110 may be part of different entities or computing systems.

Figure 4:
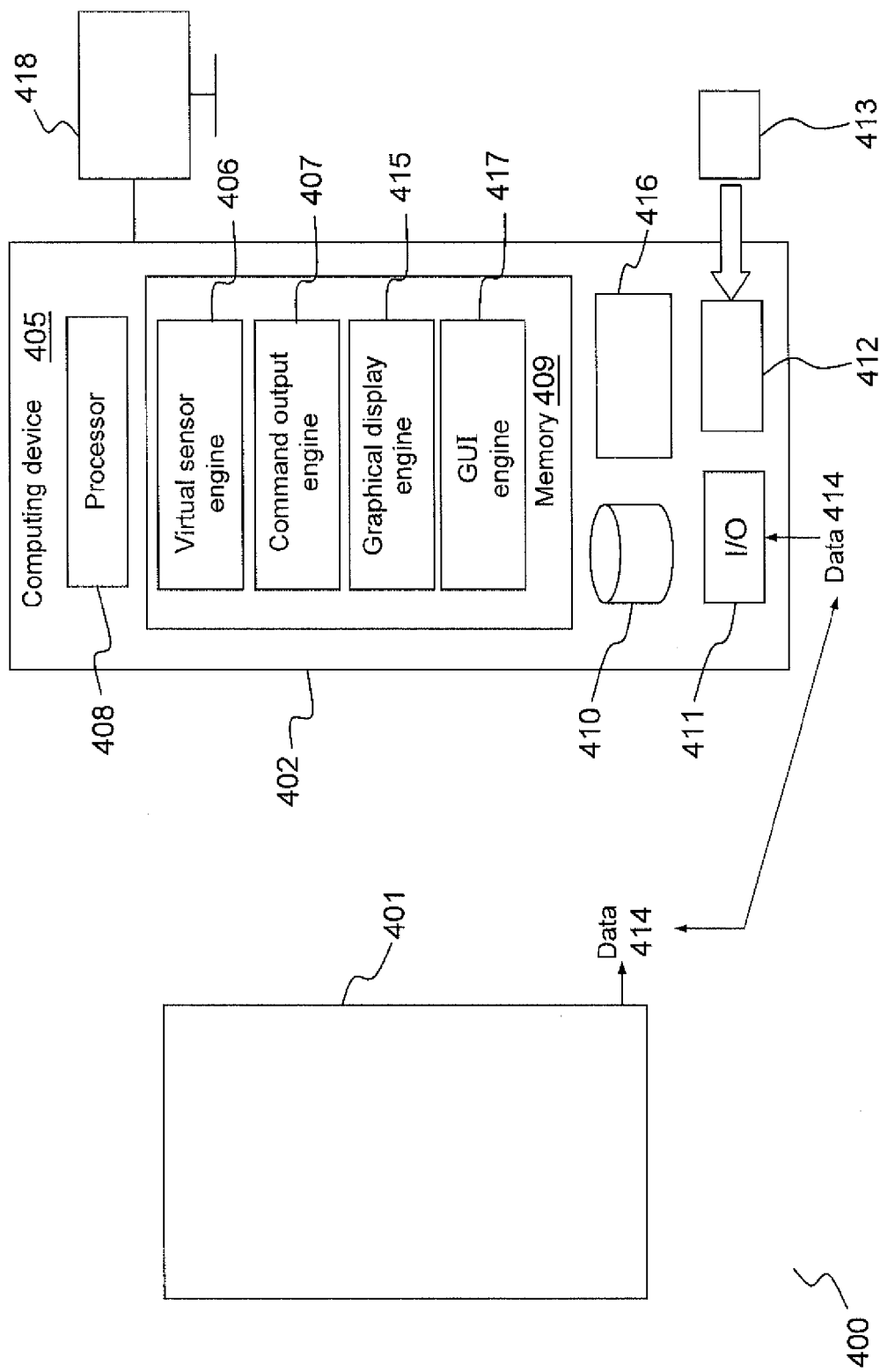
FIG. 4 illustrates an example virtual sensor system according to an example embodiment.

FIG. 4 shows another exemplary embodiment of a virtual sensor system 400 which includes a scene capture sub-system 401 and a virtual sensor sub-system 402. In the illustrated example, the computing device 405 is communicatively coupled via suitable interfaces and communication links with the scene capture sub-system 401.

In the shown implementation, a computing device 405 implements additional components, besides the virtual sensor engine 406 and command output engine 407 which may be identical to the corresponding components described with respect to FIG. 1, such as a graphical display engine 415 and a Graphical User Interface (GUI) engine 417. The graphical display engine 415 and GUI engine 417 are illustrated as software, but can be implemented as hardware or as a combination of hardware and software instructions.

In addition to functionality described with respect to the virtual sensor engine 106 of FIG. 1, the virtual sensor engine 406 includes functionality to define and configure a virtual sensor, for example via a graphical user interface provided by the GUI engine 417.

The graphical display engine 415 includes functionality to receive a 3D image data representation of the scene, as may be generated and provided thereto by the scene capture sub-system 101 or by the virtual sensor engine 406, and generate a graphical diagram from such 3D image data representation which may be displayed on display 418. In one or more embodiments, the graphical display engine 415 is operatively connected to the user interface controller 416 and display 418.

The GUI engine 417 includes functionality to provide a user interface for a virtual sensor application, e.g. for the defining and configuration of virtual sensors. In one or more embodiments, the GUI engine 417 is operatively connected to the user interface controller 416 and display 418.

When executing, such as on processor 408, the virtual sensor engine 406 is operatively connected to the graphical display engine 415, and is also operatively connected to the GUI engine 417. For example, the virtual sensor engine 406 may be part of a same software application as the graphical display engine 415 and the GUI engine 417, the graphical display engine 415 and the GUI engine 417 may each be a plug-in for the virtual sensor engine 406, or another method may be used to connect the graphical display engine 415 and the GUI engine 417 to the virtual sensor engine 406.

Similar to the device 105 described with respect to FIG. 1, the computing device 405 may be a computer, computer network, or other device that has a processor 408, memory 409, data storage 410, and other associated hardware such as input/output interfaces 411 and a media drive 412 for reading and writing a removable computer storage medium 413. In an embodiment, the removable computer storage medium 413 may contain computer instructions which, when executed by the computing device 405, cause the computing device 405 to perform one or more example methods described herein. Thus, the removable computer storage medium 413 may include instructions for implementing and executing the virtual sensor engine 406, the command output engine 407, the graphical display engine 415 and/or the GUI engine 417. In some embodiments, at least some parts of the example virtual sensor engine 406, command output engine 407, graphical display engine 415 and/or GUI engine 417 may be stored as instructions on a given instance of the removable storage medium 413, removable device, or in local data storage 410, to be loaded into memory 409 for execution by the processor 408.

Although the illustrated example virtual sensor engine 406, command output engine 407, graphical display engine 415 and GUI engine 417 are depicted as a program residing in memory 409, a virtual sensor engine 406, command output engine 407, graphical display engine 415 and/or GUI engine 417 may be implemented as hardware, such as an application specific integrated circuit (ASIC) or as a combination of hardware and software.

It will be appreciated that the virtual sensor system 400 shown and described with reference to FIG. 4 is provided by way of example only. Numerous other architectures, operating environments, and configurations are possible. Other embodiments of the system may include fewer or greater number of components, and may incorporate some or all of the functionality described with respect to the system components shown in FIG. 4. Accordingly, although the virtual sensor engine 406, the command output engine 407, the graphical display engine 415, the GUI engine 417, the local memory 409, and the data storage 410 are illustrated as part of the virtual sensor system 400, no restrictions are placed on the location and control of components 406-407-409-410-415-417. In particular, in other embodiments, components 406-407-409-410-415-417 may be part of different entities or computing systems.

Example Method

Figure 2:
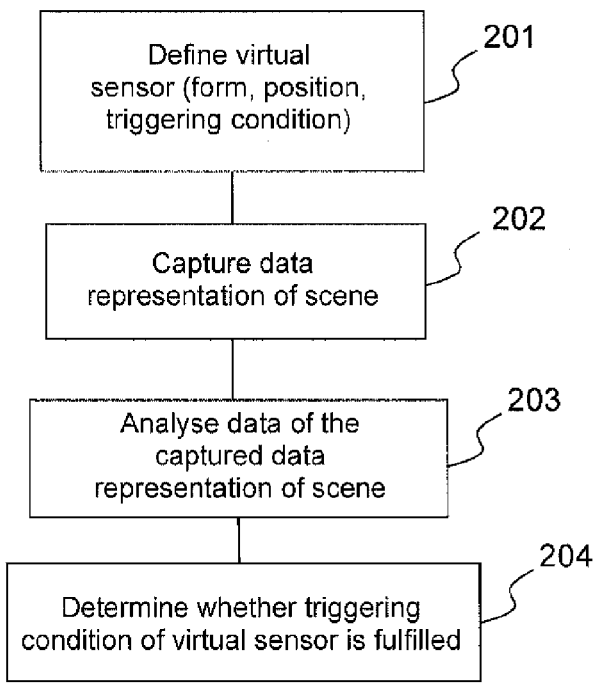
FIG. 2 illustrates a flow diagram of an exemplary method for detecting activation of a virtual sensor according to an example embodiment.

Referring now to FIG. 2, the example method 200 may be implemented using the exemplary system 100 or 400 described above, which includes the scene capture sub-system 101 or 401 and the virtual sensor sub-system 102 or 402. In the following reference will be made to components of the virtual sensor system 100 described with respect to FIG. 1. It should be noted that the following description of example methods could be also implemented using the elements of the exemplary system 400 described with respect to FIG. 4.

The scene capture sub-system 101 may capture a scene which contains surfaces, which may be for example the surfaces of objects in the scene and/or the surfaces of walls in case of capture of an indoor scene.

One or several virtual sensors are defined 201, each comprising data representing a geometric form, a position in the captured scene, and a trigger condition. In an embodiment in which captured data representation of the scene includes image data representation of the scene, the parameters of one or several of the virtual sensors are chosen in view of the captured image data representation of the scene, so that the virtual sensor is created once a captured image data representation has been received by the virtual sensor sub-system 102.

It should be noted though that a virtual sensor can be created independently of, or without any preliminary capture of an image data representation of a scene in which the newly defined virtual sensor is to be positioned. The parameters defining the virtual sensor will include a position of the virtual sensor in the scene, which however does not require that the virtual sensor be defined based on an image of a scene.

Preferably, the virtual sensors are configured so that they define an area (surface in 2D or volume in 3D) positioned in the scene which is compatible with their triggering condition(s). In an embodiment, the triggering of a virtual sensor is determined based on the analysis of a captured data representation of a scene. For example, the scene may include objects, the surface of which may be represented in a 3D image data representation of the scene, generated in some embodiments from the captured data representation of the scene. Therefore, in an embodiment, the 3D image data representation of the scene may include points which represent surfaces of objects of the captured scene. If a virtual sensor is defined and positioned to be located under or behind a surface represented in the 3D image data representation, the virtual sensor area may not be in the section of the sensing volume that is "visible" from the sensor(s) of the scene capture sub-system. If the triggering condition associated with such a virtual sensor is related to a predetermined number of non-empty points detected in the area defined by the sensor, this triggering condition will not be fulfilled, so that the positioning of the virtual sensor and the scene captured by the scene capture sub-system may be considered incompatible. However, it is possible to process the captured first data representation of the scene for removing data that represent a background of the scene, including data representing objects included in the scene, such as a virtual sensor may be defined with the object being inside the volume area of the virtual sensor.

In an embodiment, the definition and configuration 201 of a virtual sensor includes the definition of the geometric form of the virtual sensor, the configuration of the position of the virtual sensor in the scene, and a trigger condition of the virtual sensor. Defining the geometric form of a virtual sensor may in some embodiments include defining its size relative to the scene in which it will be positioned. Defining the position of the virtual sensor may in some embodiments include defining the orientation in space of the virtual sensor. Once the geometric form and positioning of the virtual sensor are defined, the virtual sensor is a set of data that corresponds to an area defined by points located at respective distances from an origin in a predetermined coordinate system.

Once the initialization phase of defining and configuring a virtual sensor is complete, a data representation of a scene is captured 202. The scene capture sub-system 101 captures 202 a data representation of a scene and generates digital data that represent the captured scene. For example, in an embodiment, the scene capture sub-system 101 generates point cloud data that represents surfaces detected by the sensor(s) 103 in the captured scene. Point cloud data provided by the scene capture sub-system 101 can be viewed as data representing a set of non-empty points in the sensing volume together with, for each of those points, data representing 3D coordinates with respect to a predetermined origin. The predetermined origin may for example be a 3D camera in the case where the scene is captured by a sensor 103 which is a 3D image sensor (e.g. a 3D camera). In an embodiment, data for each point of the point cloud may include, in addition to the 3D coordinate data, other data such as color data, intensity data, noise data, etc.

The scene capture sub-system 101 sends a captured data representation of the scene to the virtual sensor sub-system 102. Upon reception of the captured data representation of the scene, the virtual sensor sub-system 102 analyzes 203 data of the captured data representation of the scene to determine whether the triggering condition of the previously defined virtual sensor is fulfilled 204.

In some embodiments, the analysis 203 of the data of the captured data representation of the scene is based on the definition of the triggering condition of the virtual sensor.

For example, in an embodiment, the triggering condition may specify a threshold corresponding to a number of points beyond which the triggering condition of the virtual sensor will be considered fulfilled. For example, the triggering condition may be considered fulfilled if a user's object enters the volume area defined by the geometric form and position of the virtual sensor resulting in a number of non-empty points beyond said the specified threshold. The user's object may be any kind of object, comprising a part of the body (e.g. hand, limb), or any material object like a stick, a box, a suitcase, an animal, etc. The virtual sensor and the triggering condition may be chosen based on the way the object is expected to enter the virtual sensor's volume area. For example, if we expect a finger to enter the virtual sensor's volume area in order to fulfill the triggering condition, the size of the virtual sensor may not be the same as if we expect a hand or a full body to enter the virtual sensor's volume area to fulfill the triggering condition. In such case, the analysis 203 of the data of the captured data representation may comprise determining the number of non-empty points in such data whose position in the sensing volume falls within the area defined by the geometric form and position of the virtual sensor. This determination may involve testing each point represented by the data of the captured data representation, and checking that the point under test is not located inside the area defined by the geometric form and position of the virtual sensor. Once the number of points located inside the virtual sensor area is determined, it is compared to the triggering threshold. If the determined number is greater or equal to the triggering threshold, the triggering condition of the virtual sensor is considered fulfilled. Otherwise the triggering condition of the virtual sensor is considered not fulfilled.

Also for example, in another embodiment, a virtual sensor may be defined with several distinct triggering conditions. In such case, the analysis 203 of the data of the captured data representation may comprise a sequential or parallelized analysis of the data in view of each triggering condition, and the determination that at least one of the triggering condition is fulfilled may lead to stopping other data analysis carried out with respect to other triggering conditions for which such determination has not yet been reached.

Also for example, in another embodiment, the triggering condition may specify a certain amount of intensity beyond which the triggering condition of the virtual sensor will be considered fulfilled. In such case, the analysis 203 of the data of the captured data representation will comprise determining the amount of intensity in the points in such data whose position in the sensing volume falls within the area defined by the geometric form and position of the virtual sensor. Once the amount of intensity of the points located inside the virtual sensor is determined, it is compared to the triggering intensity threshold. If the determined amount of intensity is greater or equal to the triggering threshold, the triggering condition of the virtual sensor is considered fulfilled. Otherwise the triggering condition of the virtual sensor is considered not fulfilled. The intensity refers herewith to the intensity of a given physical characteristic defined in relation with the sensor of the scene capture sub-system. For example, in the case of a sound based scene capture sub-system, the triggering condition may be fulfilled when the intensity of sound of the points located in the virtual sensor's volume area exceeds a given threshold. Other physical characteristics may be used, as for example the temperature of the points located in the virtual sensor's volume area, the reflectivity, etc.

Figure 3:
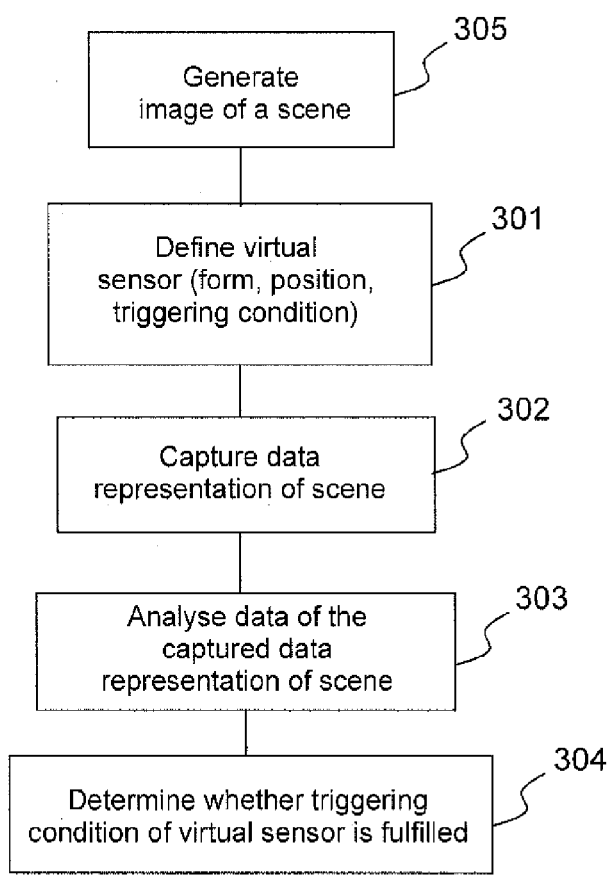
FIG. 3 illustrates a flow diagram of an exemplary method for detecting activation of a virtual sensor according to another example embodiment.

In one embodiment of the process for defining virtual sensor, an initialization image of the scene in which the virtual sensor is to be positioned is generated from a data representation of the scene, and the definition of parameters of the sensor (in particular size and position in the scene) is done using a display of the initialization image. FIG. 3 illustrates the method for defining the virtual sensor based on an image of the scene in which the virtual sensor is to be virtually positioned. Referring to FIG. 3, the definition of the virtual sensor 301, capturing of a data representation of the scene 302, analyzing of the data of the captured data representation of the scene 303, and determining whether a triggering condition of the virtual sensor is fulfilled 304, are identical to the corresponding elements of the method described above with respect to FIG. 2. Shown on FIG. 3 is a generation 305 of an image of the scene in which the virtual sensor is to be positioned (virtually). In an embodiment, this generation 305 of an image of the scene may be similar, if not identical, to the generation of 3D image data representation of the scene as part of the process for determining whether a triggering condition of the virtual sensor is fulfilled once the virtual sensor is defined. That is, the scene capture sub-system 101 may capture a data representation of the scene, from which an image of the scene is generated 305.

For example, in an embodiment, the scene capture sub-system 101 may generate point cloud data that represents surfaces of objects in the captured scene. The scene capture sub-system 101 may then send such point cloud data to the virtual sensor sub-system 102. Upon reception of the point cloud data, the virtual sensor sub-system 102 may display on a screen an image of the point cloud, which may be used for purposes of defining and configuring 301 a virtual sensor in the captured scene.

Figure 5:
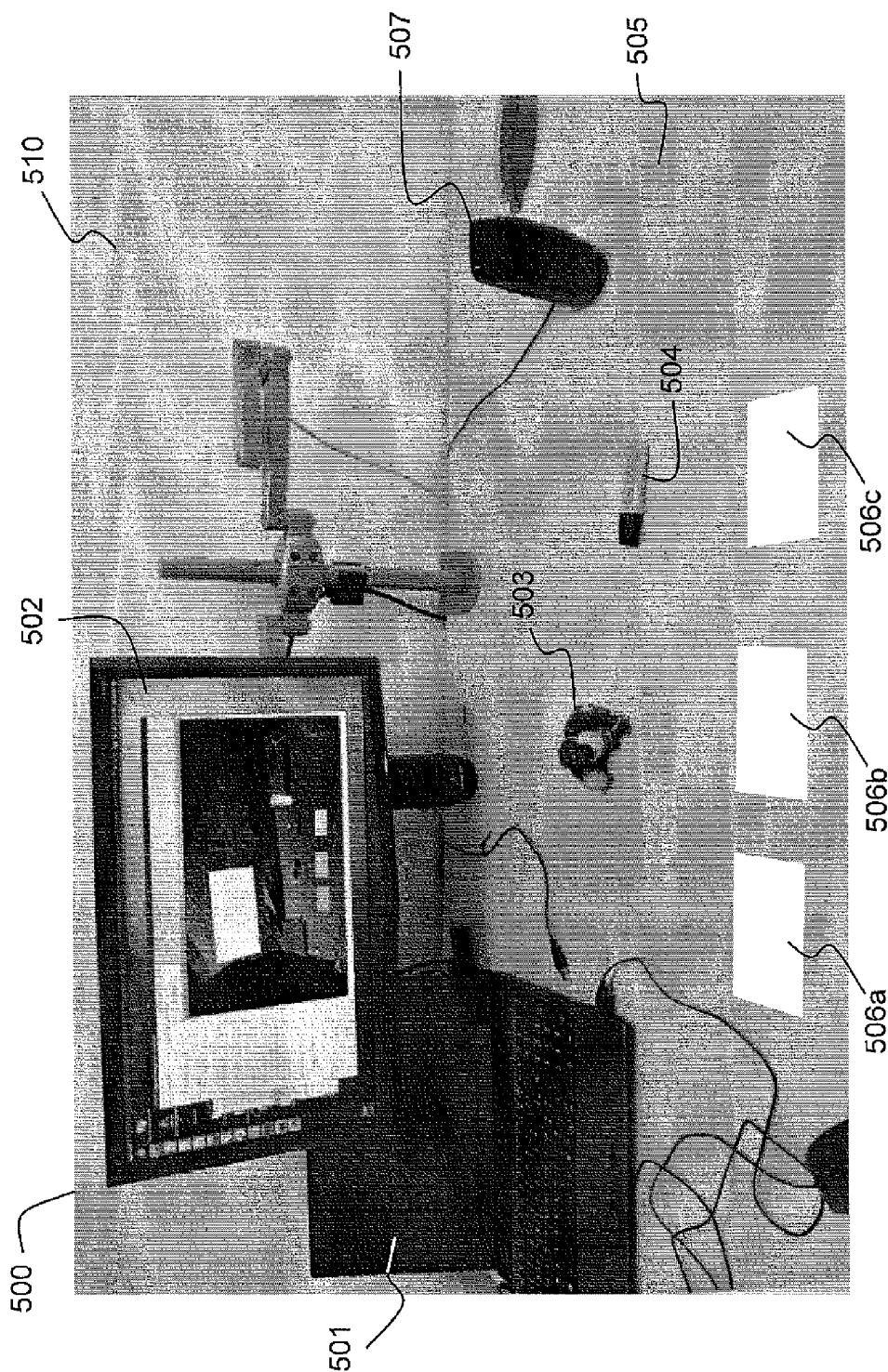
FIG. 5 illustrates a photographed image of a scene.
Figure 6:
FIG. 6 illustrates an example image generated from 3D image data representation of the scene photographed on FIG. 5 according to an example embodiment.

FIG. 5 shows a photographed image of a scene, and FIG. 6 illustrates an example embodiment of display of a computer generated image 600 corresponding to the scene photographed in FIG. 5, that may be provided in an embodiment by the scene capturing sub-system 101 to the virtual sensor sub-system 102. As shown in FIG. 6, the captured image 500 may be generated from a data representation of a scene captured by the sensor(s) 103 and processed by the data representation processing module 104 of the scene capturing sub-system

101 as described with respect to FIG. 1. FIG. 5 shows a photographic image of a scene 500 that contains a number of objects such as a laptop computer 501, a computer screen 502, a monkey toy 503, three post-its 506a, 506b and 506c, a loud speaker 507 and a pen marker 504 that are placed on the surface of a table 505, in front of a back wall 510.

FIG. 6 shows a computer generated image 600 of the captured scene where surfaces corresponding to the above-mentioned objects (including the surface of the table and the surface of the back wall) can be recognized. FIG. 6 shows an exemplary display of an image generated from a captured data representation of a scene, which may be for example in an embodiment in the form of a point cloud data or a depth image, representing a captured scene and corresponding to the sensing volume of the image sensor(s) used for capturing the scene. The points shown on the image of FIG. 6 corresponds to non-empty points in the point cloud, which are positioned in the image based on the position data generated by the image sensor or calculated based on data generated by sensors. In addition, FIG. 6 shows seven virtual sensors 602, 603, 604, 606a, 606b, 606c, 607 positioned in the displayed image. The virtual sensors 606a, 606b, and 606c are positioned with respect to the position of the post-its 506a, 506b, and 506c shown on the photographic image of the scene of FIG. 5. The virtual sensor 602 is positioned with respect to the position of the computer screen 502 shown on the photographic image of the scene of FIG. 5. The virtual sensor 604 is positioned with respect to the position of the pen marker 504 shown on the photographic image of the scene of FIG. 5. It may for example be used to launch a playing list displayed on the computer screen 502. The virtual sensor 603 is positioned with respect to the position of the monkey toy 503 shown on the photographic image of the scene of FIG. 5. It may for example be used to move to the next file in a playing list displayed on the computer screen 502. The virtual sensor 607 is positioned with respect to the position of the loud speaker shown on the photographic image of the scene of FIG. 5. It may for example be used to control a volume level. Embodiments relative to trigger conditions will be detailed further in the specification.

FIG. 6 illustrates the flexibility with which virtual sensors can be defined and positioned. Virtual sensors can indeed be positioned anywhere in a given sensing volume, independently from structures and surfaces of objects in the captured scene. For instance, the post-its 506a, 506b, and 506c shown on FIG. 5 can be viewed as a marker in the sensing volume, which may be used to define a thin 3D virtual sensor of a corresponding size, shape, and position in the sensing volume. Other objects shown on FIG. 5, such as the monkey toy 503 and the pen marker 504, may be used as marker to define corresponding virtual sensor that will be positioned in the sensing volume so that they are activated for example upon touching the corresponding object. Other objects shown on FIG. 5, such as the loud speaker 507, may even be included in the volume area of the corresponding virtual sensor 607. In that case, processing the captured first data representation of the scene for removing data that represent a background of the scene will enable to remove from the computed image 600 the corresponding object 507 thus enabling to fully use the virtual sensor 607. Therefore the proposed virtual sensor technology allows defining a virtual sensor with respect to a real object in a scene, possibly with the help of a preliminary 3D image of a scene, on which positioning of newly created virtual sensors can be visualized.

Definition of a Virtual Sensor

In an embodiment, a virtual sensor is a data set comprising data representing a geometric form of the virtual sensor, data representing a position of the virtual sensor, and data representing one or several trigger conditions of the virtual sensor.

A virtual sensor data set may also comprise data representing one or several command actions to be executed responsive to determining that one or several of the trigger conditions of the virtual sensor is/are fulfilled. For example, the command actions may comprise activating/deactivating a switch in a real world object (e.g. lights, heater, cooling system, etc.) or in a virtual object (e.g. launching/stopping a computer application), controlling a volume of audio data to a given value, controlling the intensity of light of a light source, or more generally controlling the operating of a real world object or a virtual object, e.g. locking the doors, windows and any access to a room, house, apartment, office or building in general, activating or updating the content of a digital signage, signboard, hoarding, taking a picture using a webcam, a video camera, a digital camera, or any other device, storing the taken picture, send it to a particular website, mail, telephone number, etc. Command actions may further comprise creating an alert, activating an alarm, sending an alarm message in a mail, sms or any other communication form, monitoring that a triggering action was fulfilled for example for data mining purposes.

For example, the geometric form of a virtual sensor may define a two-dimensional surface in some embodiments, and a three-dimensional volume in other embodiments. The geometric form definition of a virtual sensor includes its size, which will be preferably chosen so that the virtual sensor defines a surface or a volume that fits within the sensing surface or sensing volume captured by the real sensor or set of sensors, that is, in an embodiment, the overall surface or volume that is captured by the scene capture sub-system.

In an embodiment, the set of virtual sensor data related to the geometric form of the virtual sensor represents a set of points and their respective position with respect to a predetermined origin in the overall surface or volume captured by the scene capture sub-system.

In an embodiment, the definition of the geometric form of a virtual sensor comprises selecting a predefined geometric shape and size data associated thereto. Examples of predefined geometric shapes include, but are not limited to, square shape, rectangular shape, or any polygon shape, disk shape, cubical shape, rectangular solid shape, or any polyhedron shape, and spherical shape. Such predefined geometric shape and size are parameters whose values are input to the virtual sensor engine.

In an embodiment, use of a 3D object for definition and positioning of a virtual sensor may simplify such definition and positioning, or a re-positioning of an already defined sensor, in particular when a 3D camera capable of capturing a 3D image of the scene comprising the 3D object is used.

The geometric form parameters values may be determined by a user through a graphical user interface, such as the one provided by the GUI engine 417 included in the virtual sensor sub-system 402 of FIG. 4. In addition or as an alternative, they may be predetermined in a configuration file which is used as input data by the virtual sensor engine.

In an embodiment, the definition of the position of a virtual sensor comprises selecting a position of a representation of the virtual sensor in an image of the scene captured.

The position parameters values may also be determined by a user through a graphical user interface, such as the one provided by the GUT engine 417 included in the virtual sensor sub-system 402 of FIG. 4. In addition or as an alternative, they may be predetermined in a configuration file which is used as input data by the virtual sensor engine.

Once the values of the virtual sensor geometric form parameters and position parameters are determined, the data set related to the geometric form and position of a newly defined virtual sensor may be generated by the virtual sensor engine, based on such geometric form and position parameter values. In an embodiment, the virtual sensor engine determines a set of points including their respective position with respect to a predetermined origin in the overall surface or volume captured by the scene capture sub-system, which corresponds to the selected geometric form and position of the virtual sensor. This set of points related to a virtual sensor is a subset of the set of points comprised in the overall surface or volume captured by the scene capture sub-system.

In an embodiment, the set of virtual sensor data related to trigger condition of the virtual sensor may define several trigger conditions for the same virtual sensor.

In an embodiment, the set of virtual sensor data related to a trigger condition of the virtual sensor may be related to any property or feature of points detected from the captured data representation of the scene that fall inside the surface area or volume area, as the case may be, of the virtual sensor, or to a combination of such properties or features.

For example, in an embodiment, the set of virtual sensor data related to a trigger condition of the virtual sensor may be related to the number of points detected from the captured data representation of the scene that fall inside the surface area or volume area, as the case may be, of the virtual sensor.

For example, in an embodiment, the set of virtual sensor data related to a trigger condition of the virtual sensor may be related to the intensity of points detected from the captured data representation of the scene that fall inside the surface area or volume area, as the case may be, of the virtual sensor.

For example, in an embodiment, the set of virtual sensor data related to a trigger condition of the virtual sensor may be related to the colour(s) of points detected from the captured data representation of the scene that fall inside the surface area or volume area, as the case may be, of the virtual sensor.

For example, in an embodiment, the set of virtual sensor data related to a trigger condition of the virtual sensor may be related to the surface area or volume area occupied by points detected from the captured data representation of the scene that fall inside the surface area or volume area, as the case may be, of the virtual sensor.

For example, in an embodiment, the set of virtual sensor data related to a trigger condition of the virtual sensor may be related to the position of points detected from the captured data representation of the scene that fall inside the surface area or volume area, as the case may be, of the virtual sensor.

Example Method for Controlling Volume

Figure 7A:
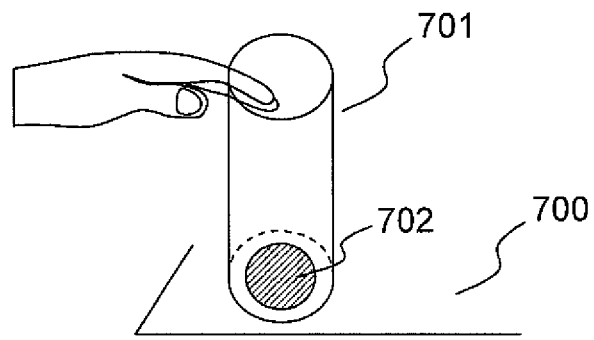
FIGS. 7A and 7B illustrate an example virtual sensor for controlling the volume of audio data.
Figure 7B:
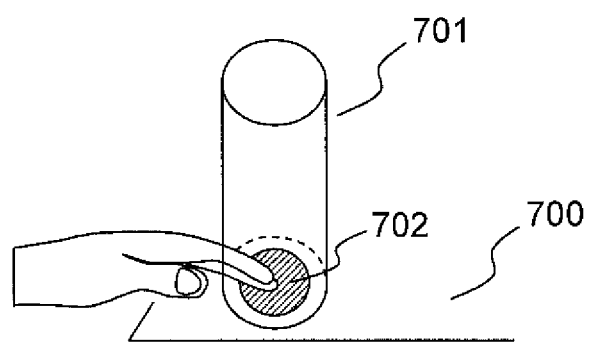

Referring now to FIGS. 7A and 7B, the following describes an exemplary embodiment of a virtual sensor for controlling the volume of audio data. A virtual sensor is defined, for example on a flat surface area 700, with a geometric form of a cylinder 701 positioned virtually on top of the flat surface as illustrated on FIG. 7. For ease of use of the virtual sensor, an area 702 of the flat surface 700 may be marked and the virtual sensor's geometric form and position may have been chosen so that its intersection with a representation of the flat surface includes the marker area 702. The marker area 702 may have been marked by being covered by a three dimensional object positioned on the surface 700 with dimensions corresponding to a desired marker area 702. Use of a 3D object for definition and positioning of a virtual sensor is convenient and simplifies such definition and positioning, or a re-positioning of an already defined sensor, in particular when a 3D camera capable of capturing a 3D image of the scene comprising the surface 700 and the 3D object is used. A plurality of trigger conditions may be defined for the virtual sensor of this embodiment, independently or in combination.

For example, a predetermined number of points that would be detected from a captured data representation of the scene as falling inside the volume area of the virtual sensor may be defined as a triggering threshold to activate a switch. Therefore, activation of the virtual sensor may be determined if the number of points detected from a captured data representation of the scene as falling inside the volume area of the virtual sensor is greater than the triggering threshold. In the example method of FIGS. 7A and 7B, a user's hand entering the volume area 701 of the virtual sensor is used to trigger the virtual sensor.

Further, a second analysis of the captured data representation of the scene may executed in order to compare the set of points detected as falling inside the volume area of the virtual sensor with the geometry of the virtual sensor. The result of such comparison may then be matched with a plurality of result values, which may in turn respectively correspond to a plurality of volume commands. In the example method of FIGS. 7A and 7B, different volume commands correspond to different positions of the user's hand in the volume area of the virtual sensor. To determine the position of the user's hand inside the virtual sensor, all the points of the volume area of the virtual sensor may be reduced to a reference point, defined for example as a centroid of the non-empty points, a mean point, a point of a given position among all the non-empty points (highest point, closest point, further point, central point, etc). A relative position of the reference point with respect to a dimension of the virtual sensor may be defined. For example in the example of FIG. 7A, 7B, a relative position with respect to the height of the cylinder 701 may be defined. Such relative position may be defined as a given percentage of the height of the cylinder 701. The percentage calculated as a function of the position of the user's hand in the volume area of the virtual sensor may trigger the volume intensity. The position of the user's hand as depicted in FIG. 7A for example may correspond to the maximum available volume intensity, while the position of the user's hand as depicted in FIG. 7B may correspond to the minimum available volume intensity. When the user's hand falls in between, the volume intensity is adapted according to the relative position of the reference point calculated with respect to these two positions.

While the invention has been described with respect to preferred embodiments, those skilled in the art will readily appreciate that various changes and/or modifications can be made to the invention without departing from the spirit or scope of the invention as defined by the appended claims. In particular, the invention is not limited to specific embodiments regarding the virtual sensor systems and may be implemented using various architecture or components thereof without departing from its spirit or scope as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and subcombinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for detecting activation of a virtual sensor in a scene, wherein the virtual sensor comprises data representing a three-dimensional geometric form, data representing a position in the scene and data representing one or several trigger conditions, the method comprising:
    capturing a first data representation of the scene using at least one physical sensor; and
    determining whether one or several of the virtual sensor trigger conditions is/are fulfilled based on an analysis of the captured first data representation in a first volume area corresponding to the geometric form and position of the virtual sensor,
    wherein the determining whether a virtual sensor trigger condition is fulfilled comprises
        analyzing point cloud data representing surfaces of objects detected by the at least one physical sensor in the scene, the point cloud data comprising data representing non-empty points of a second volume area corresponding to the captured first data representation and respective associated position in the second volume area and
        determining whether an object of the scene enters the first volume area corresponding to the geometric form and position of the virtual sensor by determining whether a number of non-empty points whose position fall in the first volume area which correspond to the geometric form and position of the virtual sensor is beyond a threshold specified by a trigger condition.

2. The method according to claim 1, wherein the first data representation of the scene includes an image data representation of the scene.

3. The method according to claim 1, further comprising:
    capturing a second data representation of the scene;
    configuring the geometric form and position of the virtual sensor based on an image generated from the captured second data representation.

4. The method according to claim 1, wherein analyzing point cloud data representing points in the first volume area which corresponds to the geometric form and position of the virtual sensor comprises:
    detecting the points of the point cloud which are positioned in the first volume area corresponding to the geometric form and position of the virtual sensor; and
    comparing the number of detected points to a predetermined threshold.

5. The method according to claim 1, wherein analyzing point cloud data representing points in the first volume area which correspond to the geometric form and position of the virtual sensor comprises:
    detecting the points of the point cloud which are positioned in the area corresponding to the geometric form and position of the virtual sensor;
    determining an intensity value representing intensity amounts for some of the detected points; and
    comparing the determined intensity value to a predetermined threshold.

6. The method according to claim 1, further comprising processing the captured first data representation of the scene for removing data that represent a background of the scene.

7. The method according to claim 1, further comprising defining and configuring one or several virtual sensors in the scene using the first data representation of the scene.

8. A system for detecting activation of a virtual sensor in a scene, the system comprising:
    a scene capture sub-system configured to capture a scene using at least one physical sensor and generate a first data representation of the scene;
    a virtual sensor sub-system in operative communication with the scene capture sub-system, the virtual sensor sub-system comprising an interface for receiving data representing the first data representation of the scene, a processor, and a memory operatively coupled to the processor, wherein the virtual sensor sub-system is configured for detecting activation of the virtual sensor in the scene, wherein the virtual sensor comprises data representing a three-dimensional geometric form, data representing a position in the scene and data representing one or several trigger conditions, and wherein the detecting activation of the virtual sensor in the scene comprises:
        determining whether one or several of the virtual sensor trigger condition is/are fulfilled based on an analysis of the captured first data representation in a first volume area corresponding to the geometric form and position of the virtual sensor,
        wherein the determining whether a virtual sensor trigger condition is fulfilled comprises
            analyzing point cloud data representing surfaces of objects detected by said at least one sensor in the scene, the point cloud data comprising data representing non-empty points of a second volume area corresponding to the captured first data representation and respective associated position in the second volume area and
            determining whether an object of the scene enters the first volume area corresponding to the geometric form and position of the virtual sensor by determining whether a number of non-empty points whose position fall in the first volume area which correspond to the geometric form and position of the virtual sensor is beyond a threshold specified by a trigger condition.

9. A system according to claim 8, wherein the virtual sensor sub-system includes functionality to define and configure one or several virtual sensors in the scene using the first data representation of the scene.

10. A non-transitory computer-readable storage medium storing computer-executable instructions for detecting activation of a virtual sensor in a scene, the computer executable instructions comprising instructions for:
    receiving data representing a three-dimensional geometric form of the virtual sensor, data representing a position of the virtual sensor in the scene, and data representing one or several trigger conditions of the virtual sensor;
    receiving data representing a first data representation of the scene captured by at least one physical sensor; and
    determining whether one or several of the virtual sensor trigger condition is/are fulfilled based on the analysis of the received data,
    wherein the determining whether a virtual sensor trigger condition is fulfilled comprises analyzing point cloud data representing surfaces of objects detected by said at least one sensor in the scene, the point cloud data comprising data representing non-empty points of a second volume area corresponding to the captured first data representation and respective associated position in the second volume area and determining whether an object of the scene enters the first volume area corresponding to the geometric form and position of the virtual sensor by determining whether a number of non-empty points whose position fall in the first volume area which correspond to the geometric form and position of the virtual sensor is beyond a threshold specified by a trigger condition.

11. A non-transitory computer program product comprising computer program code tangibly embodied in a computer readable medium, said computer program code comprising instructions to, when provided to a computer system and executed, cause said computer to perform a method for detecting activation of a virtual sensor in a scene, wherein the virtual sensor comprises data representing a three-dimensional geometric form, data representing a position in the scene and data representing one or several trigger conditions, the method comprising determining whether one or several of the virtual sensor trigger conditions is/are fulfilled based on an analysis of data representing a captured first data representation of the scene in a first volume area corresponding to the geometric form and position of the virtual sensor, wherein the determining whether a virtual sensor trigger condition is fulfilled comprises analyzing point cloud data representing surfaces of objects detected by said at least one sensor in the scene, the point cloud data comprising data representing non-empty points of a second volume area corresponding to the captured first data representation and respective associated position in the second volume area and determining whether an object of the scene enters the first volume area corresponding to the geometric form and position of the virtual sensor by determining whether a number of non-empty points whose position fall in the first volume area which correspond to the geometric form and position of the virtual sensor is beyond a threshold specified by a trigger condition.

12. A non-transitory computer-readable storage medium storing a computer program that, when executed, causes a system comprising a processor operatively coupled with a memory, to perform a method for detecting activation of a virtual sensor in a scene, wherein the virtual sensor comprises data representing a three-dimensional geometric form, data representing a position in the scene and data representing one or several trigger conditions, the method comprising determining whether one or several of the virtual sensor trigger conditions is/are fulfilled based on an analysis of data representing a captured first data representation of the scene in first volume area corresponding to the geometric form and position of the virtual sensor, wherein the determining whether a virtual sensor trigger condition is fulfilled comprises analyzing point cloud data representing surfaces of objects detected by said at least one sensor in the scene, the point cloud data comprising data representing non-empty points of a second volume area corresponding to the captured first data representation and respective associated position in the second volume area and determining whether an object of the scene enters the first volume area corresponding to the geometric form and position of the virtual sensor by determining whether a number of non-empty points whose position fall in the first volume area which correspond to the geometric form and position of the virtual sensor is beyond a threshold specified by a trigger condition.

13. The method according to claim 1, wherein the virtual sensor and trigger condition are chosen based on a way an object of the scene is expected to enter the first volume area which corresponds to the geometric form and position of the virtual sensor.

14. The method according to claim 1, wherein the size of the virtual sensor is chosen based on an object of the scene which is expected to enter the first volume area which corresponds to the geometric form and position of the virtual sensor.

* * * * *